US008808007B2

(12) United States Patent
Hebert

(10) Patent No.: US 8,808,007 B2
(45) Date of Patent: Aug. 19, 2014

(54) BORE CONNECTOR FOR DYNAMOELECTRIC MACHINE

(71) Applicant: General Electric Company, Schenectady, NY (US)

(72) Inventor: Curtis Maurice Hebert, Guilderland, NY (US)

(73) Assignee: General Electric Company, Schenectady, NY (US)

( * ) Notice: Subject to any disclaimer, the term of this patent is extended or adjusted under 35 U.S.C. 154(b) by 115 days.

(21) Appl. No.: 13/718,095

(22) Filed: Dec. 18, 2012

(65) Prior Publication Data

US 2014/0170910 A1      Jun. 19, 2014

(51) Int. Cl.
*H01R 39/00*      (2006.01)
*H01R 13/207*     (2006.01)

(52) U.S. Cl.
CPC .................................. *H01R 13/207* (2013.01)
USPC ....................................................... 439/11

(58) Field of Classification Search
USPC ........................................................ 439/11
See application file for complete search history.

(56) References Cited

U.S. PATENT DOCUMENTS

| 3,829,825 | A | | 8/1974 | Hawkins | |
|---|---|---|---|---|---|
| 4,415,825 | A | | 11/1983 | Dailey et al. | |
| 5,185,918 | A | | 2/1993 | Shafer, Jr. | |
| 5,358,432 | A | * | 10/1994 | Shih et al. | 439/825 |
| 5,382,856 | A | * | 1/1995 | Keck et al. | 310/71 |
| 5,814,912 | A | * | 9/1998 | Ross | 310/71 |
| 6,280,265 | B1 | * | 8/2001 | Hopeck et al. | 439/843 |
| 6,347,968 | B1 | * | 2/2002 | Hamilton et al. | 439/843 |
| 6,453,540 | B1 | * | 9/2002 | Blakelock et al. | 29/598 |
| 6,632,109 | B2 | * | 10/2003 | Irwin et al. | 439/825 |
| 8,541,916 | B2 | * | 9/2013 | Whitener et al. | 310/71 |
| 2002/0078548 | A1 | * | 6/2002 | Blakelock et al. | 29/596 |
| 2003/0003813 | A1 | * | 1/2003 | Irwin et al. | 439/825 |

* cited by examiner

*Primary Examiner* — Ross Gushi
(74) *Attorney, Agent, or Firm* — Ernest G. Cusick; Hoffman Warnick LLC

(57) ABSTRACT

Embodiments of the invention relate generally to dynamoelectric machines and, more particularly, to bore connectors for dynamoelectric machines. In one embodiment, the invention provides a bore connector for a shaft of a dynamoelectric machine, the bore connector comprising: a pair of elongate connector bodies, each having a substantially hemispherical shape in cross section and at least one of which having: a radially opening aperture including an inner surface, at least a portion of which is threaded; and a threaded member having a threaded outer surface compatible with the threaded inner surface of the aperture, the threaded member being threadable into and out of the aperture.

20 Claims, 4 Drawing Sheets

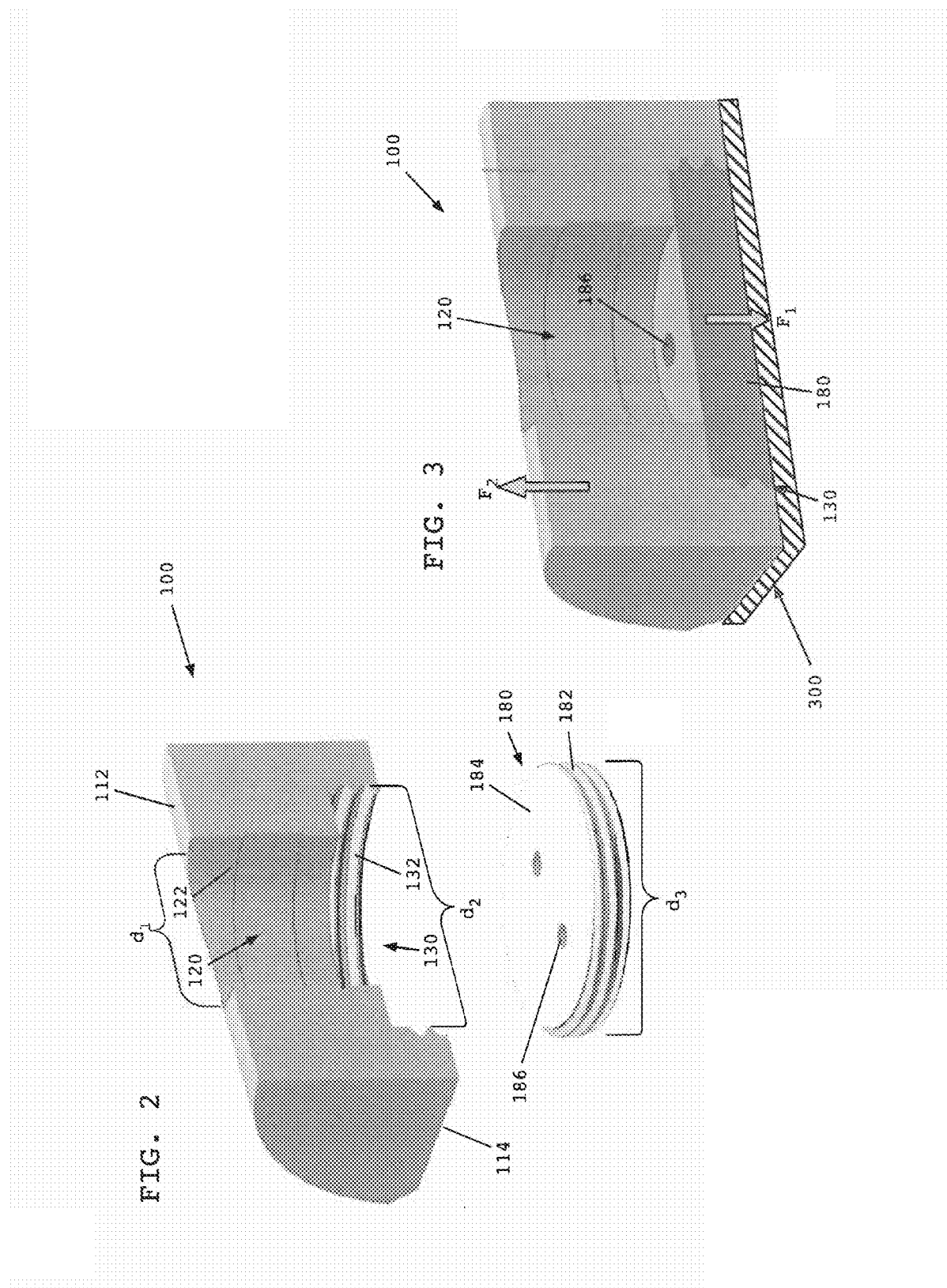

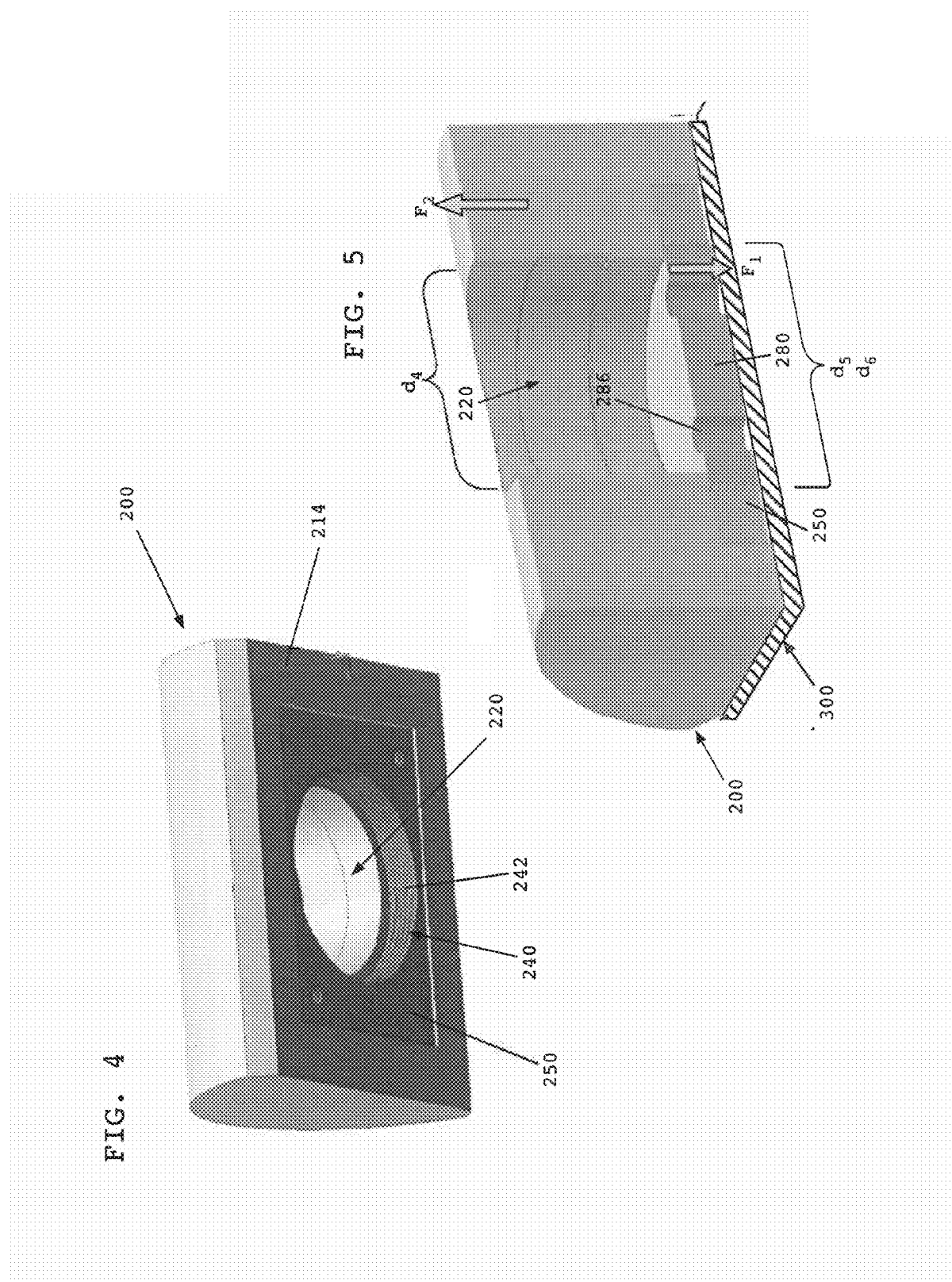

BORE CONNECTOR FOR DYNAMOELECTRIC MACHINE

BACKGROUND OF THE INVENTION

Embodiments of the invention relate generally to dynamoelectric machines and, more particularly, to bore connectors for dynamoelectric machines.

Rotors of dynamoelectric machines typically comprise relatively large diameter cylindrical bodies containing field windings. These field windings produce magnetic flux which in turn produces current and voltage. Electrical connections are made between the field windings and a bore connector, a conductive material within a relatively small diameter of the rotor. Copper is often the conductive material employed in bore connectors, which are therefore often referred to as "bore coppers."

To date, the primary method of restraining bore connectors within a rotor bore is to reduce clearance between the bore connectors, which are typically comprised of hemispherically-divided halves of an elongate conductive rod, by custom fitting insulating strips between the bore connector halves. FIG. 1 shows a view of such device 1, which includes a rotor 2 having a central bore 3 along its longitudinal axis. A bore connector 4, comprising two connector bodies 10, 20 are disposed within central bore 3. A rigid separator 30 or insulating strip is disposed between connector bodies 10, 20, forcing the arcuate outer surfaces 12, 22 of each connector body 10, 20, respectively, against the wall of central bore 3. However, this can be both time consuming and relatively ineffective, as the bore connectors, in use, often require a greater degree of restraint during operation than can be achieved using insulating strips.

Other methods of restraining bore connectors within the rotor bore include wrapping the bore connectors with an insulator, which is then milled such that its outer diameter matches an inner diameter of the rotor bore. This is not only labor intensive and time consuming, but also makes it difficult to insert the bore connectors into the rotor bore. What is more, such methods necessarily guarantee that the degree of restraint cannot be increased after the bore connectors are installed within the rotor bore.

BRIEF DESCRIPTION OF THE INVENTION

In one embodiment, the invention provides a bore connector for a shaft of a dynamoelectric machine, the bore connector comprising: a pair of elongate connector bodies, each having a substantially hemispherical shape in cross section and at least one of which having: a radially opening aperture including an inner surface, at least a portion of which is threaded; and a threaded member having a threaded outer surface compatible with the threaded inner surface of the aperture, the threaded member being threadable into and out of the aperture.

In another embodiment, the invention provides a bore connector for a shaft of a dynamoelectric machine, the bore connector comprising: a pair of elongate connector bodies, each having a substantially hemispherical shape in cross-section, at least one of which having: a radial opening aperture extending from an arcuate outer surface of the elongate connector body through to a substantially planar inner surface of the elongate connector body; and an insert device disposed along the inner surface of the elongate connector body, the insert device including: a body having an internally threaded aperture substantially aligned with the radial opening aperture; and a threaded member having an outer threaded surface compatible with the internally threaded aperture, the threaded member being threadable into and out of the internally threaded aperture.

In still another embodiment, the invention provides a bore connector for a shaft of a dynamoelectric machine, the bore connector comprising: a pair of elongate connector bodies, each having a substantially hemispherical shape in cross-section, at least one of which has a radially opening aperture including an inner surface, at least a portion of which is threaded.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which:

FIGS. 2 and 3 show partial cross-sectional perspective views of a bore copper according to one embodiment of the invention.

FIGS. 4 and 5 show partial cross-sectional perspective views of a bore copper according to another embodiment of the invention.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

Figure 1:
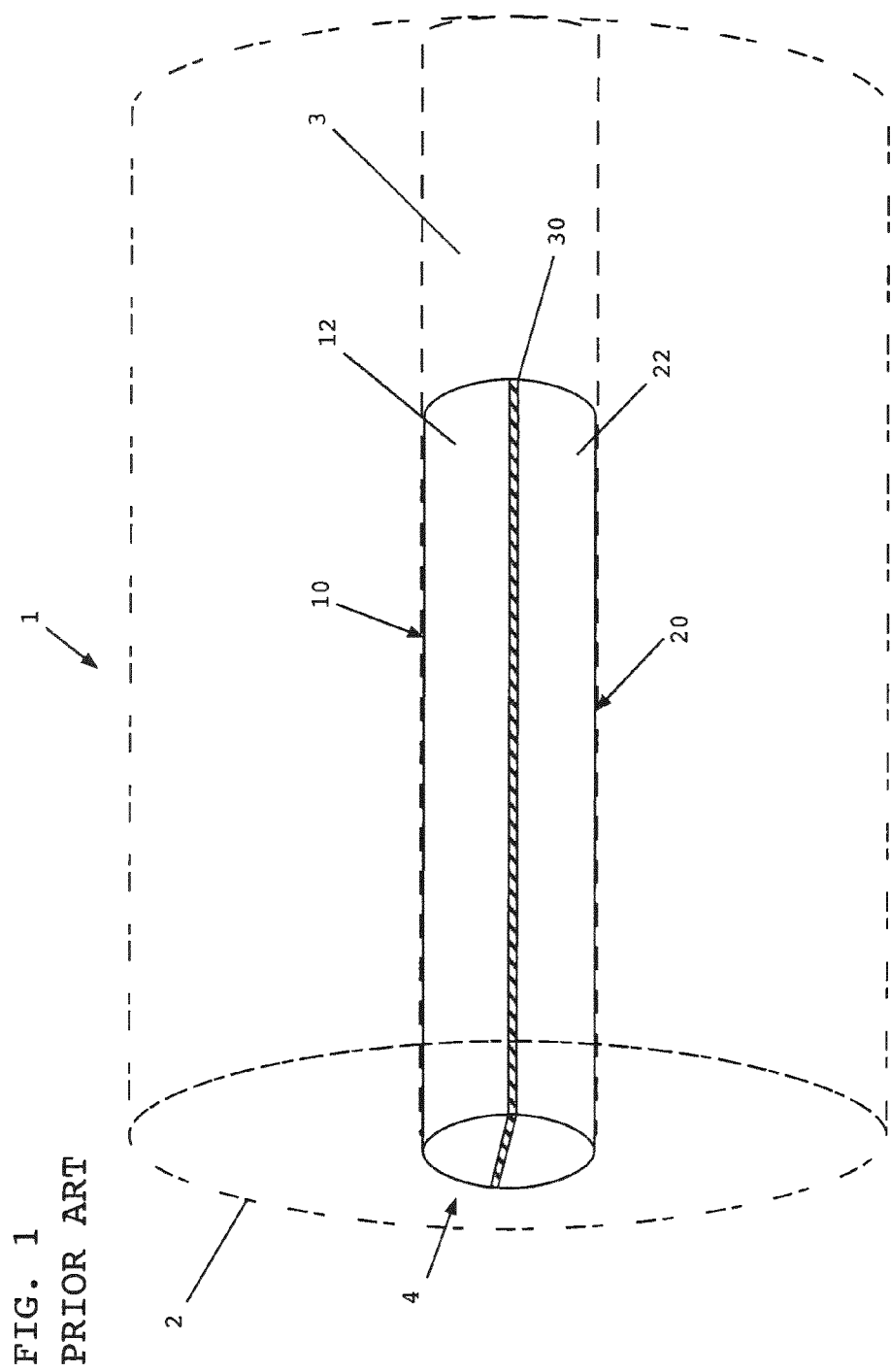
FIG. 1 shows a known rotor and bore copper.

FIG. 2 shows a perspective cross-sectional view of a bore connector body 100 according to one embodiment of the invention. For the sake of simplicity of explanation, FIG. 2 shows only a portion of one of the two connector bodies that would be employed. One skilled in the art will understand that connector body 100 may often be both more elongate and would be used in combination with a similar connector body disposed opposite to the one connector body shown.

Bore connector body 100 includes a first radially-opening aperture 120 extending inward from an arcuate outer surface 112 and a second radially-opening aperture 130 extending outward from a substantially planar inner surface 114 to first radially-opening aperture 120. As shown in FIG. 2, first radially-opening aperture 120 includes an unthreaded inner surface 122 and has a first diameter $d_1$. As will be explained in more detail below, according to some embodiments of the invention, the inner surface 122 of first radially-opening aperture 120 may be threaded. Second radially-opening aperture 130 includes a threaded inner surface 132 and has a second diameter $d_2$ greater than first diameter d1.

A threaded member 180 has a diameter $d_3$ substantially equal to second diameter $d_2$ of second radially-opening aperture 130 and includes a threaded outer surface 182 compatible with threaded inner surface 132 of second radially-opening aperture 130, such that threaded member 180 may be threaded into and out of second radially-opening aperture 130. As shown in FIG. 2, the smaller diameter d1 of first radially-opening aperture 120 prevents threaded member 180 from entering first radially-opening aperture 120. This, however, is neither necessary nor essential. In some embodiments of the invention, $d_1$ may be equal to or greater than $d_2$, the embodiment shown in FIG. 2 being illustrative of one embodiment of the invention. Also according to some embodiments of the invention, threaded member 180 may include an interface 186 at its planar surface 184 to facilitate threading threaded member 180 into and out of second radially-opening aperture 130.

FIG. 3 shows perspective cross-sectional view of connector body 100 with threaded member 180 threaded into second radially-opening aperture 130 and in combination with a rigid separator 300. Again, one skilled in the art will recognize that a second connector body, not shown in FIG. 3, would be disposed opposite connector body 100 with respect to rigid separator 300. In use, threaded member 180 may be threaded partially out of second radially-opening aperture 120 using, for example, a tool passed through first radially-opening aperture 120 to contact interface 186. As threaded member 180 moves out of second radially-opening aperture 130, a force $F_1$ is exerted against rigid separator 300. This, in turn, exerts a reciprocal force $F_2$, which pushes connector body 100 away from rigid separator 300 and against a wall of a rotor bore within which connector body 100 is disposed.

As will be appreciated by one skilled in the art, the ability to increase force $F_2$ by moving threaded member 180 within second radially-opening aperture 130 allows connector body 100 to be more securely restrained within a rotor bore and does not rely on the use of specially adapted insulating strips. As noted above, the use of such strips may not provide adequate restraint of a bore connector during operation of the rotor.

FIGS. 4 and 5 show, respectively, perspective and cross-sectional perspective views of a connector body 200 according to another embodiment of the invention. Again, FIGS. 4 and 5 show only a portion of one of the two connector bodies that would be employed, as will be apparent to one skilled in the art. Referring to FIG. 4, connector body 200 includes an insert device 250 along planar surface 214. Insert device 250 lies substantially flush with planar surface 214 and includes a third radially-opening aperture 240 extending outward from planar surface 214 to first radially-opening aperture 220. Third radially-opening aperture 240 includes a threaded inner surface 242 for accepting a threaded member, as used in the embodiment shown in FIGS. 2 and 3.

FIG. 5 shows a cross-sectional view of connector body 200 with such a threaded member 280 threaded into insert device 250 and in combination with a rigid separator 300. Similar to the embodiment shown in FIGS. 2 and 3, first radially-opening aperture 220 has a diameter $d_4$ that is less than the diameter $d_5$ of third radially-opening aperture 240 and the diameter $d_6$ of threaded member 280, which are substantially equal. As noted above, however, it is neither necessary nor essential that $d_4$ be less than $d_5$, FIG. 5 being illustrative of one embodiment of the invention. Upon threading threaded member 280 out of third radially-opening aperture 240 and exerting a force $F_1$ against rigid separator 300, a reciprocal force $F_2$ is exerted by connector bore 200 against a wall of the rotor bore (not shown).

The embodiment shown in FIGS. 4 and 5, which includes insert device 250, may be useful in a number of applications. For example, as noted above, connector body 200 comprises a conductive material, often copper. Copper is a relatively soft metal, which may be deformed upon the application of too great a force. Insert device 250 and threaded member 280, in some embodiments, may include a harder material, such as steel. In such embodiments, greater force may be exerted on and between insert device and threaded member 280 than could be applied if either were formed from a softer material, such as copper.

Figure 6:
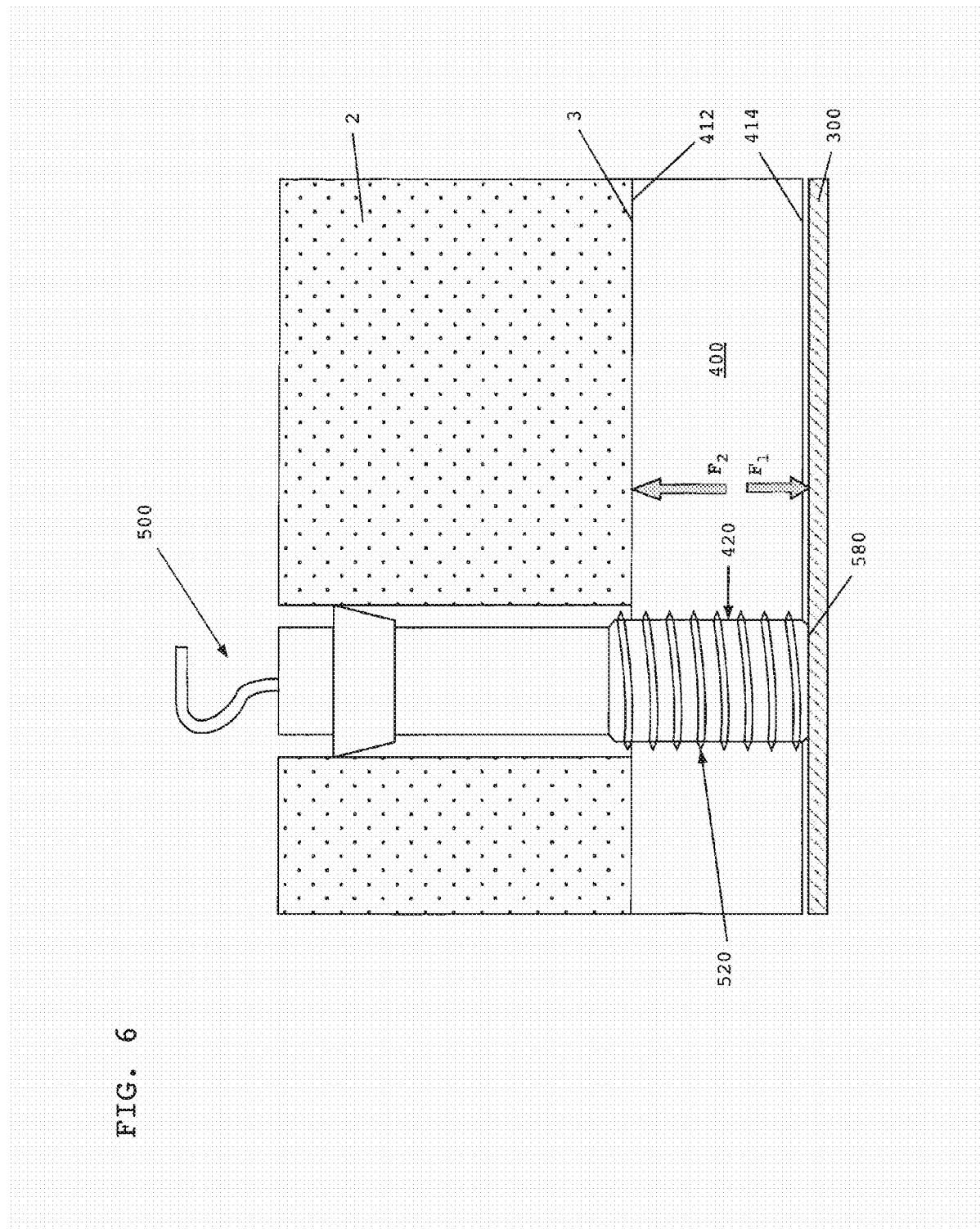
FIG. 6 shows a cross-sectional side view of a rotor, bore copper, and terminal plug according to still another embodiment of the invention.

Other variations of the embodiments of the invention described above are possible, of course, and are within the scope of the invention. For example, FIG. 6 shows one such embodiment in which the bore connector 400 may be provided with a single radially-opening aperture 420 that extends from the outer arcuate surface 412 through to the planar surface 414, at least a portion of which is threaded. In some embodiments, such as that shown in FIG. 6, the entire radially-opening aperture may be threaded, such that a terminal plug 500 having a correspondingly threaded outer surface 520 may be threaded into the radially-opening aperture 420. In some embodiments, such as that shown in FIG. 6, an end 580 of such a terminal plug 500 may itself function as does the threaded member 180 (FIG. 2) described above. That is, such a terminal plug 500 may be threaded into the radially-opening aperture 420 and against a rigid separator 300, thereby exerting a force $F_1$ against the rigid separator 300 and inducing a reciprocal force $F_2$ of the bore connector 400 against the central bore 3 of rotor 2.

In any of the embodiments of the invention, the threaded member or other device acting as the threaded member may, upon the desired amount of restraint of the bore connector being obtained, be locked or fixed in place to prevent movement of the threaded member or other device and an accompanying reduction in the restraint of the bore connector within the rotor bore.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

This written description uses examples to disclose the invention, including the best mode, and also to enable any person skilled in the art to practice the invention, including making and using any devices or systems and performing any related or incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A bore connector for a shaft of a dynamoelectric machine, the bore connector comprising:
    a pair of elongate connector bodies, each having a substantially hemispherical shape in cross section and at least one of which having:
        a radially opening aperture including an inner surface, at least a portion of which is threaded; and
        a threaded member having a threaded outer surface compatible with the threaded inner surface of the aperture, the threaded member being threadable into and out of the aperture.

2. The bore connector of claim 1, further comprising:
    a rigid separator disposable between the pair of elongate bodies, wherein at least one of the threaded members is moveable within the aperture and against the rigid separator to move at least one of the elongate connector bodies away from the rigid separator.

3. The bore connector of claim 1, wherein the inner surface of the radially opening aperture includes:
a first portion extending inward from an arcuate outer surface of the elongate body; and
a second portion extending inward from a substantially planar inner surface of the elongate body to a termination of the first portion.

4. The bore connector of claim 3, wherein the first portion has a first diameter and the second portion has a second diameter greater than the first diameter.

5. The bore connector of claim 4, wherein the first portion is unthreaded and the second portion is threaded.

6. The bore connector of claim 4, wherein the threaded member has a diameter substantially equal to the second diameter of the second portion, such that the threaded member is threadable into and out of the second portion.

7. The bore connector of claim 6, wherein the threaded member is not threadable into or out of the first portion.

8. The bore connector of claim 1, wherein the threaded member includes a surface for interfacing a device for threading the threaded member into or out of the aperture.

9. A bore connector for a shaft of a dynamoelectric machine, the bore connector comprising:
a pair of elongate connector bodies, each having a substantially hemispherical shape in cross-section, at least one of which having:
a radial opening aperture extending from an arcuate outer surface of the elongate connector body through to a substantially planar inner surface of the elongate connector body; and
an insert device disposed along the inner surface of the elongate connector body, the insert device including:
a body having an internally threaded aperture substantially aligned with the radial opening aperture; and
a threaded member having an outer threaded surface compatible with the internally threaded aperture, the threaded member being threadable into and out of the internally threaded aperture.

10. The bore connector of claim 9, further comprising:
a rigid separator disposable between the pair of elongate bodies,
wherein the threaded member is moveable within the internally threaded aperture of the insert device and against the rigid separator to move at least one of the elongate connector bodies away from the rigid separator.

11. The bore connector of claim 9, wherein the radial opening aperture has a first diameter and the internally threaded aperture of the insert device has a second diameter greater than the first diameter.

12. The bore connector of claim 11, wherein the threaded members has a diameter substantially equal to the second diameter.

13. The bore connector of claim 9, wherein the threaded members includes a surface for interfacing a device for threading the threaded member into or out of the internally threaded aperture of the insert device.

14. A bore connector for a shaft of a dynamoelectric machine, the bore connector comprising:
a pair of elongate connector bodies, each having a substantially hemispherical shape in cross-section, at least one of which has a radially opening aperture including an inner surface, at least a portion of which is threaded.

15. The bore connector of claim 14, further comprising:
a rigid separator disposable between the pair of elongate bodies.

16. The bore connector of claim 15, wherein the radially opening aperture is compatible with a threaded member, the threaded member being threadable into the radially opening aperture and against the rigid separator to move at least one of the elongate connector bodies away from the rigid separator.

17. The bore connector of claim 14, wherein the inner surface of the radially opening aperture includes:
a first portion extending inward from an arcuate outer surface of the elongate body; and
a second portion extending inward from a substantially planar inner surface of the elongate body to a termination of the first portion.

18. The bore connector of claim 17, wherein the first portion has a first diameter and the second portion has a second diameter greater than the first diameter.

19. The bore connector of claim 14, wherein the radially opening aperture extends from an arcuate outer surface of the elongate connector body through to a substantially planar inner surface of the elongate body and the at least one elongate connector body includes:
an insert device disposed along the inner surface of the elongate connector body, the insert device including:
a body having an internally threaded aperture substantially aligned with the radial opening aperture.

20. The bore connector of claim 19, wherein the radial opening aperture has a first diameter and the internally threaded aperture of the insert device has a second diameter greater than the first diameter.

* * * * *